May 16, 1939.  R. M. HVID  2,158,238
PROCESS FOR THERMAL ATMOLYSIS AND APPARATUS EMPLOYING SAME
Filed Jan. 11, 1935   3 Sheets-Sheet 1

Fig.1.

Section A-A.

INVENTOR.
Rasmus M. Hvid
BY Jones, Addington, Ames
& Seibold
ATTORNEYS.

Patented May 16, 1939

2,158,238

UNITED STATES PATENT OFFICE 2,158,238

PROCESS FOR THERMAL ATMOLYSIS AND APPARATUS EMPLOYING SAME

Rasmus M. Hvid, Wilmette, Ill.

Application January 11, 1935, Serial No. 1,273

33 Claims. (Cl. 62—125)

Having invented an atmolysis apparatus, I herein fully disclose its construction and mode of operation, so that any one skilled in the art can make and operate such an apparatus without difficulty.

It being customary in connection with apparatus and machines to identify a type by its mode of operation, I suggest that the words "Thermal Atmolysis" properly identify the type of apparatus or machines covered by my invention.

As a means of disclosure, I have chosen to show, in Fig. 1, an apparatus suitable for various atmolysis purposes, and in Figs. 2 and 3, in a somewhat diagrammatic form, a refrigerating apparatus or machine embodying the principle of thermal atmolysis in its operation. Fig. 6 illustrates an alternative arrangement of the heating means.

The materials used in the construction of the apparatus and machines must be such materials as will not interact chemically with the gases. In the refrigerating machine shown, I chose, for the purpose of illustration, to use sulphur dioxide and hydrogen as the refrigerating and neutral mediums, respectively, and in such case, wrought iron, steel, copper and brass, as well as several other materials, are suitable materials of construction. All joints, wherever practical, should be welded or brazed, because such joints in a refrigerating machine are subjected to considerable internal pressure; and strength, as well as gas-tightness, is important.

The refrigerating machine shown herein is completely sealed, and escape of gas is impossible. The "hermetic" construction in this case is thoroughly practical, for the reason that there are no moving parts inside the machine and the heating means are located entirely outside the space in the machine containing the gases.

Figure 1:
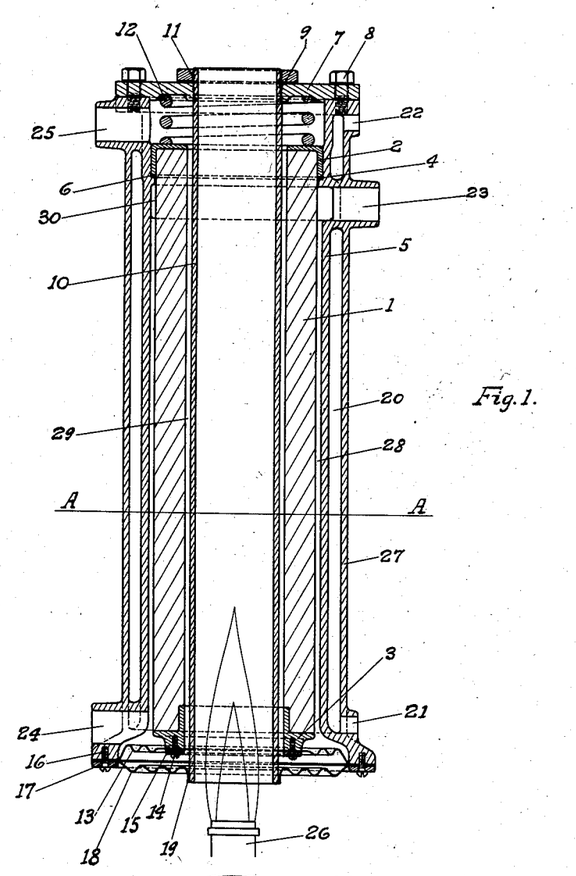

The heating means shown in Fig. 1 is a gas or oil burner. The apparatus absorbs heat from the hot gases of combustion passing through it when the burner is in operation. Instead of a gas or oil burner, a suitable supply of steam, hot water, hot gas, etc., from the near or a distant source, may be carried to, and passed through, the apparatus; or an electric means of a suitable type may be inserted in, or applied to, the apparatus to cause operation.

Figures 2, 3, 6:
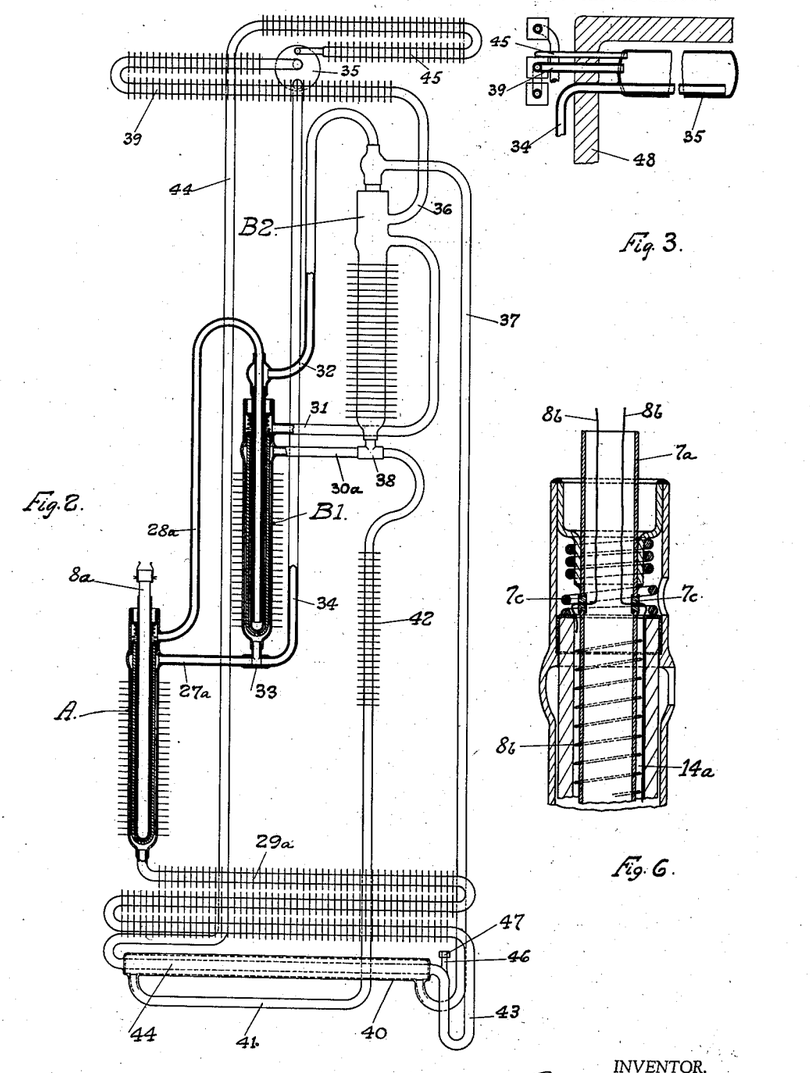
Figure 4:
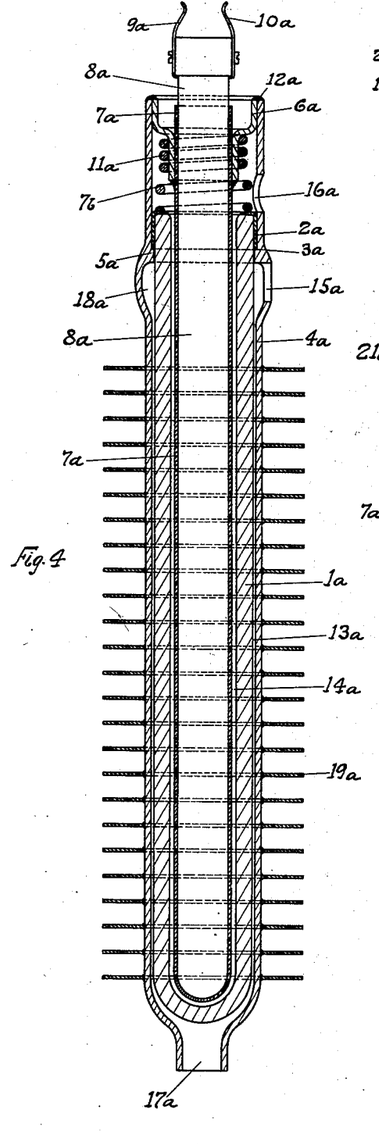
Figs. 4 and 5 show, in a larger scale, the atmolysis apparatus employed in the refrigerating machine illustrated in Figs. 2 and 3.

The refrigerating machines and apparatus illustrated in Figs. 2 and 4 are shown having electric heating means.

Operation of the apparatus and machines covered by my invention may be continuous or stopped any time by putting into or out of action the heating means.

Referring now to Fig. 1, I is a porous tube; 2 is a metal ring firmly cemented to one end of the porous tube; 3 is another metal ring firmly cemented to the other end of the porous tube; 4 is a gasket under metal ring 2; 5 is a body, or wall, adapted to receive porous tube I with metal rings attached. The body has an internal shoulder 6, upon which gasket 4 rests. Cover 7 is bolted gas-tight to one end of body 5. The bolting is done with bolts 8. In the center of cover 7 is a threaded opening 9. Tube 10 is screwed into opening 9, and the tube is locked gas-tight to cover 7 by nut 11. Between cover 7 and metal ring 2 is placed compression coil spring 12. This spring holds metal ring 2 firmly against gasket 4, thus making the whole joint gas-tight.

To metal ring 3, on the end of porous tube I, is clamped gas-tight metal diaphragm 13, by means of screws 14 and ring 15. The outer rim of diaphragm 13 is clamped gas-tight, by means of screws 16 and ring 17, to the end of body 5. At the same time the outer rim of metal diaphragm 18 is clamped gas-tight, by the same means, to the outer rim of diaphragm 13. This double joint is thus made completely gas-tight. The inner rim, or edge, of diaphragm 18 is brazed to, or otherwise made gas-tight, to tube 10, as shown at 19.

The two diaphragms, themselves gas-tight, are used in order to obtain complete gas-tightness as well as freedom from excessive strains caused by unequal expansion of the different parts. 20 is a jacket for the circulation of a cooling medium, and having at each end openings 21 and 22 as inlet and outlet; 23 is the inlet for the mixed gases, and 24 is the outlet for the heavier gas after atmolysis has occurred, or vice versa; 25 is the outlet for the lighter gas, or gas mixture, separated by atmolysis; 26 is a gas or oil burner for the operation of the apparatus. This burner may be located at either end of the apparatus. 27 is the outside wall of jacket 20; 28 is a narrow annular space between porous tube I and body, or wall, 5; 29 is a narrow annular space between tube 10 and porous tube I; 30 is a clearance space in body 5 and surrounding the porous tube, to secure even distribution around the porous tube of the mixed gases entering through inlet 23.

Figure 5:
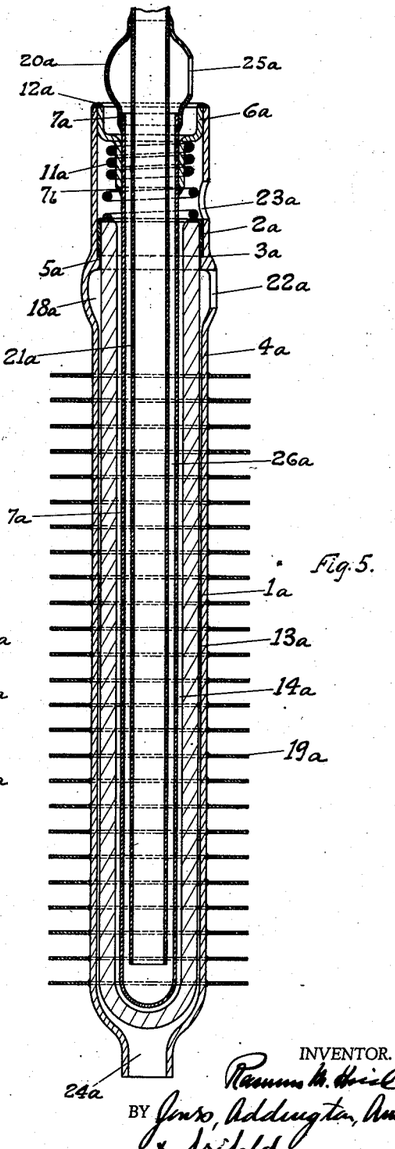

In Figs. 4 and 5 are shown the two forms of atmolysis apparatus employed in the refrigerating machine illustrated in Figs. 2 and 3. A in Fig. 2 stands for the complete assembly shown in Fig. 4, and B1 and B2 each stands for the complete assembly shown in Fig. 5.

Referring to Fig. 4, 1a is a porous tube closed at one end and open at the other; 2a is a metal ring firmly cemented to the open end of the porous tube; 3a is a gasket fitting underneath metal ring 2a; 4a is the body, or wall, of the apparatus. The body has an internal shoulder 5a, upon which gasket 3a rests; 6a is a cap, or head, fitting the body as shown; 7a is a thin tube closed at one end and open at the other. Tube 7a is joined gas-tight to head 6a, and head 6a is shown joined to body 4a; 8a is an electric heater. This type of heater is commonly called an "immersion" heater. The outside diameter of heater 8a is such that the heater fits snugly into tube 7a; 9a and 10a are clips attached to the socket end of heater for the purpose of holding the electric conduit-socket (not shown) to the heater; 11a is a compression coil spring.

In assembling, after porous tube 1a with ring 2a, gasket 3a and spring 11a are put in position, head 6a, to which tube 7a is welded at 7b, is located as shown, and gas-tight joint 12a is made. Spring 11a then holds the porous tube in the proper position and exerts sufficient force upon gasket 3a to make the whole joint gas-tight.

13a is a narrow annular space between porous tube 1a and body 4a; 14a is a narrow annular space between porous tube 1a and tube 7a; 15a is the opening through which the gas mixture enters the apparatus; 16a is the opening through which the hydrogen-rich mixture leaves the apparatus; 17a is the opening through which the sulphur dioxide-rich mixture leaves the apparatus; 18a is a clearance space around porous tube 1a to secure even distribution of the cool mixture entering through opening 15a. A plurality of air cooling fins 19a are firmly attached to body 4a, as shown.

In Fig. 5, parts which are identical with parts in Fig. 4 have been given the same reference numbers. 20a is a T, joined gas-tight to the open end of tube 7a; 21a is the internal part of a tube which is joined gas-tight to the other end of T 20a and extending nearly to the inside bottom of tube 7a as shown; 22a is the opening through which the gas mixture enters the apparatus; 23a is the opening through which the hydrogen-rich mixture leaves the apparatus; 24a is the opening through which the sulphur dioxide-rich mixture leaves the apparatus; 25a is the side outlet from T 20a; 26a is the annular space between tube 7a and internal tube part 21a.

The heating means shown in Figs. 1 and 4 are located outside the space in the apparatus containing the gases. In certain cases, and when the composition of the gases permit it, electric heating wires may be carried through suitable insulators located in tube 10 (Fig. 1), or tube 7a (Fig. 4), into the annular spaces 29 and 14a, respectively, and then suitably coiled near the inner surface of the porous tubes. In such case precautions must be taken so that the wires cannot touch the metal parts of the machines. Such an arrangement is illustrated in Fig. 6. Heater 8a has been removed, and heating wire 8b is introduced through the open end of 7a and then passed into and out from the annular space 14a, through insulators 7c.

The porous tubes 1 and 1a, shown in Figs. 1, 4, and 5, must be made of a material which will not interact chemically with the gases coming into contact with it. The material should be a poor conductor of heat, because the efficiency of the machine while in operation depends upon being able to maintain the greatest possible temperature difference between the gases contacting the outside and inside surfaces of the porous tube. The porosity of the tube wall should also be of such character that the laws of effusion, rather than the laws of transpiration, apply to the passage of gas through the tube wall, or, in other words, the flow of gas through the porous wall should, as nearly as possible, be analogous to the flow of gas through a small hole in a thin plate, rather than analogous to the flow of gas through a long capillary passage.

A porous tube manufactured from a suitable grade of diatomaceous earth, similar to the ones now frequently used for various filtering purposes, fulfills perhaps best the above requirements. Other materials which may be used in the construction of the porous tube for various kinds of thermal atmolysis apparatus are burned clay, plaster of Paris, and unglazed porcelain. Also meerschaum, graphite, and others, the selection depending upon the particular apparatus and the service required in each case. New materials are sometimes found or discovered, and I do not wish to be limited in the use of any material which I find suitable, except as specified in the claims.

In the drawings I have shown the porous wall as being in the form of a tube. While this form is most suitable for the apparatus illustrated, in other machines and apparatus for thermal atmolysis an entirely different form of porous wall may be preferable. The wall in such cases may take the form of a flat and relatively thin plate, a plug, or a diaphragm, or it may be a wall of compressed granules or powders of various materials held in position by screens at each end, or other forms, each to fit its particular object.

The porous wall must always be mounted in the atmolysis apparatus in such a manner that gases on one side of the wall cannot pass by it to the space on the opposite side of the wall, except through the pores of the wall.

Referring now to Fig. 2. To apparatus A is joined tubes 27a and 28a and the upper end of sulphur dioxide condenser 29a. The joints are made at openings 15a, 16a, and 17a, respectively, referring to Fig. 4. To the apparatus B1, adjacent to A, is joined tubes 30a, 31, and 32, and T 33 at openings 22a, 23a, 25a, and 24a, respectively, referring to Fig. 5. Tube 27a joins T 33. To T 33 tube 34 is joined as shown. Tube 34 is also joined to evaporator 35 and extends into the evaporator almost to the other end, as shown in Fig. 3. To apparatus B2 is joined tubes 31, 36, and 37, and T 38 at openings 22a, 23a, 25a, and 24a, respectively, again referring to Fig. 5.

Tube 30a joins T 38. Tube 36 becomes hydrogen cooler 39 as shown, and the other end of cooler 39 joins evaporator 35. Tube 37 joins heating jacket 40 at one end. Tube 41, leaving heating jacket 40 at the other end, joins T 38. Suitable air cooling fins 42 are arranged on tube 41, as shown.

The lower end of sulphur dioxide condenser 29a is bent to form U-tube 43, and it next, as tube 44, extends through heating jacket 40. Continuing, it becomes secondary sulphur dioxide condenser 45. The lower end of secondary condenser 45 joins evaporator 35, as shown in Fig. 3. To the short leg of U-tube 43 is joined a short tube 46. This tube is fitted with a suitable opening and closing means 47 at its outer end.

48 indicates a part vertical section through the back upper corner of the refrigerator cabinet to which the refrigerating machine is applied.

It will be observed that the general arrangement of the machine shown in Figs. 2 and 3 is such that it can be arranged on the back of a refrigerating cabinet.

It will also be realized that, while the drawings show a machine of relatively small capacity, machines embodying the same principle of operation may be built in other sizes and for other refrigerating purposes by simply changing the size of the parts, modifying them and suitably rearranging them, and I do not want to be limited in such respects in any way, except in accordance with the claims.

The refrigerating machine illustrated herein employs air cooling wherever cooling is required, but this is a matter of choice, and other forms of cooling, as, for instance, water cooling, may be used if desired. In such case a jacket, as 20 in Fig. 1, may be fitted to the parts requiring cooling and the cooling medium circulated through same.

The operation of the apparatus and machines of my invention is based on certain laws or general facts which have long been known from the molecular theory and studies of the physical properties of gases, and, for the purpose of describing the operation, such facts are stated in a convenient form as follows:

1. Equal volumes of all gases, under the same condition of pressure and temperature, contain the same number of molecules.
2. In a gas, the molecules are in constant motion and are at no time at rest.
3. In a gas, the number of molecules in unit volume is proportional to the absolute pressure, the temperature being the same.
4. In a gas, the number of molecules in unit volume is inversely proportional to the absolute temperature, the pressure being the same.
5. In a gas, the velocity of the molecules is proportional to the square root of the absolute temperature.
6. In a mixture of gases, the total pressure of the mixture is equal to the sum of the partial pressure of the several gases.
7. In a mixture of gases, each gas acts as if it alone occupied the space confining the mixture.
8. In a mixture of gases, velocities of the molecules of each gas are inversely proportional to the square roots of their masses in unit volume or to the square roots of their molecular weights.

In order to elucidate the operation of the apparatus shown herein, the effect on, and behavoir of, a single gas in the apparatus shown in Fig. 1 will be described first.

Assume that a gas of uniform pressure and temperature fills the apparatus. The pores in the wall of porous tube 1 being large, compared to the size of the gas molecules, the gas is constantly passing from the outside of the tube to the inside, and vice versa. The conditions on both sides being in equilibrium, the same quantity passes from each side to the other in equal time.

If heating means 26 is now put into operation, the gas on the two sides of the porous wall will be at different temperatures, and the condition of equilibrium is therefore destroyed. More molecules will then pass from one side than from the other.

The velocity of the molecules is proportional to the square root of the absolute temperature, and the quantity which passes out through the pores in the porous wall is proportional to this velocity and to the mass in unit volume. Hence, on whichever side the product of the mass in unit volume into the square root of the absolute temperature is the greatest, more molecules will pass from that side than from the other through the pores.

As an illustration, assume the mass in unit volume outside the porous tube is 1 and the absolute temperature is 1; then the product on the side is 1.

If the absolute temperature of the gas on the inside of the porous tube is now assumed to be 2, the mass in unit volume, compared to the gas on the inside, is ½, and the square root of the absolute temperature is 1.414. The product for the inside of the tube is therefore 0.707. Hence, more molecules pass from the outside of the tube than from the inside.

If the pressure is permitted to build up inside the porous tube, the flow of molecules from the outside will go on until the product of the mass in unit volume into the square root of the absolute temperature is equal on both sides of the porous wall. The condition of equilibrium is that the mass in unit volume must be inversely as the square root of the absolute temperature, and since the pressure is as the product of the mass in unit volume into the absolute temperature, the pressure will be directly proportional to the square root of the absolute temperature.

If we assume, in the case illustrated, that the pressure on the outside of the porous tube is 1, a condition of equilibrium exists when the pressure inside the porous tube is equal to the square root of 2, or 1.414. Stated differently, more molecules will pass from the outside to the inside until the pressure on the outside is reduced to approximately 71% of the pressure on the inside. More molecules therefore pass from gas of lower pressure to gas of higher pressure until a condition of equilibrium is established.

Assume, next, that the apparatus shown in Fig. 1 is filled with a mixture of two gases, the partial pressures and molecular weights of which are different.

As with a single gas, when the heating means is put into operation, more molecules will pass from the outside than from the inside through the porous wall of the tube, but in a mixture of two gases the two kinds of molecules will pass through the porous wall at different rates of speed.

To illustrate this fact, assume the mixture consists of oxygen at a partial pressure of 1 lb. per square inch absolute pressure and hydrogen gas at a partial pressure of 9 lbs. per square inch absolute. The total pressure in the mixture is therefore 10 lbs. per square inch absolute.

If both gases had the same mass in unit volume, or the same molecular weight, 1 oxygen molecule would pass through while 9 hydrogen molecules pass through. However, the ratio of the molecular weights of oxygen to hydrogen is approximately 16 to 1, and the square root of this ratio is 4. By means of the information given heretofore, it is readily seen that 1 oxygen molecule will pass through while 9 times 4 or 36 hydrogen molecules pass through.

Suppose we now continue burner 26 in operation, and admit mixture of the original composition, pressure, and temperature to annular space 28 through opening 23 and allow it to leave through opening 24. Suppose, also, that the heated mixture is free to leave, at a pressure as originally, through opening 25, through a means such as a weighted valve. We will then obtain continuous atmolyzation, and the mixture flowing out through opening 25 will contain less oxygen molecules, while the mixture flowing out through opening 24 will contain more oxygen molecules in unit volume than the mixture flowing into the apparatus through opening 23.

If the gas mixture flowing out through opening 25 is cooled to its original temperature, and its total pressure is 10 lbs. as originally, the partial pressure of the oxygen gas in the mixture will be approximately 0.27 lb., while the partial pressure of the hydrogen in the mixture will be approximately 9.73 lbs. The partial pressures are, namely, proportional to the number of molecules of each gas in the mixture, the temperatures being the same.

If a greater degree of atmolyzation is required, the outflowing gases may be collected and passed through the apparatus again, or two or more apparatuses may be suitably interconnected, as illustrated in the refrigerating machine shown in Fig. 2, thus making the process continuous.

The rate of atmolyzation depends, of course, on the temperature difference between the gas mixture on the inside and the outside of the porous tube. It will be readily observed that if, in addition to the temperature difference, a pressure difference also exists between the mixture inside and outside the porous tube, such pressure difference will either hasten or retard the process of atmolyzation.

If, in the present case, a greater pressure exists outside the porous tube than inside, the process is hastened, while if the greater pressure is in the gas on the inside of the porous tube, the process is retarded.

It must also be evident that, in operation, the apparatus need not always be entirely closed. To illustrate, suppose, for instance, the gas mixture is admitted to the apparatus through opening 23 at atmospheric pressure, and only the gas mixture flowing out through opening 25 is to be saved, opening 24 may be open to the atmosphere; or, if the gas to be saved issues from opening 24, opening 25 may be open to the atmosphere.

The purpose of the cooling medium circulating through jacket 20 when the apparatus is in operation is for maintaining a suitably constant, and relatively low, temperature in the gas mixture outside the porous tube.

While a mixture of only two gases has been used to illustrate the principle of atmolyzation, mixtures containing more than two gases, may, of course, be atmolyzed in the same manner.

The operation of the refrigerating machine shown in Figs. 2 and 3 will now be described.

The machine is first charged with sulphur dioxide and hydrogen. The charging is done through tube 46. After charging both gases, tube 46 may be pinched to prevent loss of gas while being closed gas-tight with closing means 47. Such closing means may be a closed nut screwed onto a thread on tube 46, or a little solder may be applied in the opening of the tube.

When charging the machine, it is most convenient to charge the sulphur dioxide first as it is under a lower pressure in the machine than the hydrogen. A sufficient quantity is charged, so that liquid sulphur dioxide will at all times stand in U-tube 43 and in the horizontal length of tube 44 enclosed in jacket 40.

The hydrogen is next charged, and when the charging is completed the partial pressure of the hydrogen is considerably higher than the partial pressure of the sulphur dioxide. An example will be given later.

After charging, the two gases in the machine will be uniformly mixed. The sulphur dioxide gas will be saturated, because it is in contact with its own liquid. Its partial pressure, of course, will depend upon the temperature of the machine.

If operation of the machine is now desired, the electric heating means in apparatus A is put into operation. The mixture inside the porous tube becomes heated, and atmolyzation in the apparatus occurs in the manner shown when explaining the operation of the apparatus in Fig. 1. In operation, the mixture inside the porous tube will therefore contain less sulphur dioxide molecules in unit volume, while the mixture outside the porous tube will contain more sulphur dioxide molecules in unit volume, than before.

We will now consider the action on the operation of the mixture inside the porous tube in apparatus A. The mixture leaves apparatus A through tube 28a. Moving through tube 28a into apparatus B1, it changes direction in the bottom of tube 7a (Fig. 5) and returns through annular space 26a (Fig. 5) to T 20a, and leaves apparatus B1 through tube 32 (Fig. 2). From tube 32 it moves into apparatus B2. The movement through B2 is similar to the movement of the mixture through B1, and the mixture issues from B2 through tube 37. From tube 37 it enters jacket 40, passing through it, and leaves jacket at the opposite end through tube 41. In cooler 42, the gas is cooled nearly to room temperature. From cooler 42, through T 38 and tube 30a, it enters the upper end of the annular space outside the porous tube in apparatus B1. In apparatus B1 the mixture is further atmolyzed, and a mixture containing still less sulphur dioxide molecules in unit volume leaves the inside of the porous tube in B1, through tube 31, for apparatus B2, where it enters the upper end of the annular space outside the porous tube and is atmolyzed the third time.

The mixture leaving the inside of the porous tube in apparatus B2 is now nearly pure hydrogen. This gas leaves B2 through tube 36 and, moving upward through hydrogen cooler 39, it is cooled nearly to room temperature. From cooler 39, the hydrogen enters one end of evaporator 35, as shown in Fig. 3.

Now, while the movement and change of mixture inside the porous tubes has taken place, a corresponding movement and change occurs in the mixture outside of the porous tubes. Referring to apparatus A, the sulphur dioxide molecules in unit volume in the mixture outside the porous tube becomes more numerous; consequently, the mixture becomes heavier, and it therefore moves downward by force of gravity into condenser 29a. When, as a result of this change, the partial pressure of the sulphur dioxide gas in condenser 29a exceeds the maximum sulphur dioxide vapor pressure existing in the condenser and which corresponds to the temperature of the condenser, condensation of a part of the sulphur dioxide gas takes place and the resulting liquid drains to U-tube 43.

Considering the movement and change of the mixture in the annular spaces outside of the porous tubes in apparatus B1 and B2, such mixtures, due to atmolyzation in B1 and B2, also becomes heavier laden with sulphur dioxide gas and are then returned to the proper apparatus for further atmolyzation. The mixture from apparatus B2 returns to apparatus B1, through T 38 and tube 30a, and the mixture from B1 returns to apparatus A through T 33 and tube 27a.

It will have been observed that the operation of atmolysis apparatus B1 and B2 is obtained by suitably passing the hot mixture issuing from apparatus A through the two apparatuses. The mixture, still hot, after passing through B1 and B2, is next passed through jacket 40. The effect of passing the mixture through jacket 40 is to evaporate some of the liquid sulphur dioxide contained inside tube 44. Such sulphur dioxide vapor cannot pass into condenser 29a, because the cool liquid in U-tube 43 acts as a trap or barrier. The sulphur dioxide gas must therefore ascend in tube 44 and, at its top, enter condenser 45 where it condenses and runs by force of gravity to evaporator 35. The sulphur dioxide enters the evaporator in close proximity to the incoming hydrogen from cooler 39.

The partial pressure of the sulphur dioxide gas in the nearly pure hydrogen entering the evaporator being low, enables the liquid sulphur dioxide to change from a liquid to a gas at a low temperature—that is, the liquid sulphur dioxide evaporates at a low temperature and, in doing so, it gives up its latent heat. The heat required to change the sulphur dioxide from a liquid to a gas is, of course, taken from the medium surrounding evaporator 35, and this again results in the cooling of such medium. We thus have refrigeration.

The evaporation of the liquid sulphur dioxide in the hydrogen results in the re-formation of a mixture of the two gases, and when the temperature of this mixture has reached a certain height, depending on the service required, it is alowed to escape from the other end of the evaporator through tube 34, as shown, and this mixture, still quite cool, is returned to the annular space outside the porous tube in apparatus A through T 33 and tube 27a. The circuit is thus complete.

In order to secure operation of the machine with the least expenditure of electrical energy, although not necessary in order to operate the machine, it is advisable to suitably heat insulate the top portions of the atmolysis apparatus A, B1, and B2 and the tubes 28a and 32 connecting same. Also tube 37, jacket 40, and tube 34.

In Fig. 2 I have shown my invention as adapted to a household refrigerator wherein the three atmolysis devices A, B1, and B2 are located below the cooler 39, the condenser 45, and the evaporator 35. In this specific embodiment of my invention no pumps or other mechanical devices are required for assisting the flow of the refrigerating medium, or sulphur dioxide, through the system, either in liquid form or in gas form. By means of the heater 40, the refrigerating medium, after being condensed in the condenser 29a, is again evaporated and in vapor form is delivered through the pipe 44 to the second condenser 45 where the refrigerating medium is re-condensed and permitted to flow by gravity to the evaporator 35. After the neutral gas and the refrigerating medium have accomplished their work in the evaporator 35, the mixture of the neutral gas and the refrigerating medium is delivered through the pipe 34 to the atmolysis apparatus A, thus completing the cycle of operation.

The mixture of gases, on delivery to the atmolysis apparatus A through the pipe 27a, is quite cool. This mixture of gases delivered to the cool chamber of the device A thereupon comes directly in contact with the porous partition contained in the device A, whereupon the neutral gas or hydrogen will flow through the porous partition into the hot chamber of the device A at a much higher rate than the refrigerating medium or sulphur dioxide. This is assisted in part by reason of the fact that the inner wall of the porous partition is closely adjacent to the electric heating element 8a.

Inasmuch as the neutral gas is rapidly leaving the mixture because of atmolysis, the partial pressure of the refrigerating medium or sulphur dioxide is rapidly increasing. Of necessity the partial pressure of the neutral gas or hydrogen must decrease in the annular space exterior of the porous tube. As the partial pressure of the refrigerating medium or sulphur dioxide increases, the sulphur dioxide falls by gravity and its partial pressure continues to increase until it reaches the point of condensation somewhere near the bottom of the atmolysis device A, depending upon the temperature of the condenser 29a.

While, as I have described above, the apparatus shown in Fig. 2 is particularly adapted for a household refrigerator wherein no moving parts are required, it is to be understood that the heater 40 may be eliminated and also the condenser 45, and a pump of any usual form substituted for these two elements, whereby the liquefied refrigerating medium or sulphur dioxide may be delivered directly by such pump to the evaporator 35. If a pump is substituted for the heater 40 and the condenser 45, the tubular member 44 would then be connected directly to the evaporator 35 at the point where the pipe 45 of Fig. 3 is now connected to the evaporator 35. Of course, it is to be understood that if a pump is substituted for the heater 40 and the condenser 45, it will then be located at the lowest point in the condenser 29a whereby the liquefied refrigerating medium would be delivered by gravity directly to the pump.

As shown in Figs. 2 and 3, the evaporator 35 of the household type refrigerator is located at the top of the refrigerator box or cabinet, and, consequently, the atmolysis apparatus comprising the devices A, B1, and B2, the condenser 29a, and the cooler 39 is shown as being located below the evaporator. However, it is conceivable that in other types of refrigerators the evaporator 35 or its equivalent would be disposed below the atmolysis apparatus and condenser 29a, in which event the heater 40 and the condenser 45 could be dispensed with and no pump would be required for delivering the liquefied refrigerating medium or sulphur dioxide to the evaporator 35. In the event that the evaporator 35 is disposed beneath the condenser 29a, then the liquefied refrigerating medium will be delivered to the evaporator 35 by gravity. This modification of my invention will be readily apparent to any mechanic and, therefore, I do not believe it necessary to illustrate it here.

The air cooling fins, shown on the different parts requiring cooling, should be of such design and have such cooling efficiency that the gas mixture in, or passing through, the parts to which the fins are attached will be of a temperature as low as possible.

The capacity and efficiency of the refrigerating machine depends, of course, greatly upon how completely and efficiently the gas mixture is atmolyzed. Both are indicated by the pureness, or the freedom of sulphur dioxide molecules, of the hydrogen entering the evaporator during operation. The pureness of the hydrogen is influenced by the room temperature, because the higher the room temperature the higher the partial pressure of the sulphur dioxide gas in the mixture and, therefore, the less pure will be the hydrogen entering the evaporator.

As a reasonable capacity and efficiency of the refrigerating machine is required at all times, information indicating the relative amounts of sulphur dioxide and hydrogen in the mixture entering the evaporator during operation of the machine, in a room maintained at fairly high temperature, will be of interest.

Assume the refrigerating machine shown herein is operating in a room temperature of approximately 110° F. If the machine is well designed, the temperature of the gas mixture which contacts the walls to which the cooling fins are attached will be 125° F.

Assume the gas mixture leaves the evaporator at a temperature of 15° F. The partial pressure of the sulphur dioxide gas in the mixture is then 15 lbs. per square inch absolute.

The partial pressure at 125° F. of the saturated sulphur dioxide gas in mixture with hydrogen in condenser 29a is 125 lbs. per square inch absolute.

Assume, also, that the total pressure in the machine is 500 lbs. per square inch absolute.

The mixture returning from the evaporator will now enter the upper end of the annular space outside the porous tube in apparatus A with a partial pressure of sulphur dioxide gas of 15 lbs. and a partial pressure of hydrogen of 485 lbs. Due to atmolyzation, and while the mixture moves downward in the annular space to condenser 29a, these partial pressures, of course, change to 125 lbs. for the sulphur dioxide gas and 375 lbs. for the hydrogen.

For the present purpose, it is sufficiently accurate to use the mean partial pressures for the two gases. Consequently, the mean partial pressure in the sulphur dioxide gas is 70 lbs. per square inch absolute, and the mean partial pressure in the hydrogen is 430 lbs. per square inch absolute.

The ratio of the molecular weights of sulphur dioxide gas and hydrogen is approximately 32 to 1, and the square root of this ratio is approximately 5.66.

By means of the information given heretofore, and by observing that after atmolyzation in apparatus A the mixture leaving the inside of the porous tube in A is further atmolyzed in B1, and the mixture leaving the inside of the porous tube in B1 is again atmolyzed in B2, it is easily shown that the partial pressure of the sulphur dioxide gas in the mixture entering the evaporator is 0.45 lb. per square inch absolute after passing through cooler 39. The partial pressure of the hydrogen in the mixture is consequently 499.55 lbs. per square inch absolute, or, in other words, the mixture is nearly pure hydrogen.

While I have chosen to illustrate herein a refrigerating machine employing three atmolysis apparatuses, it is obvious that such choice is quite optional and that a refrigerating machine in which there are more or less than three atmolysis apparatuses may give satisfactory operation.

The pressures and temperatures quoted herein are for the purpose of illustration only.

My invention in addition to being directed to a thermal atmolysis apparatus and to a refrigerating machine embodying the same, as hereinbefore described, also includes within its scope the process or method of separating gases. My invention also includes the process or method of extracting heat from the walls of an evaporator or cooling unit that may be employed for the purpose of effecting refrigeration. Therefore, it is intended that my invention comprehend within its scope apparatus as well as the processes described above.

I claim:

1. A thermal atmolysis apparatus comprising a plurality of housings connected in series relationship and each having a porous partition forming two chambers therein, an evaporator, means for delivering a mixture of gases of different diffusibilities from said evaporator to one of said chambers in said first housing, means for heating the gases contained in the other chamber of said first housing, means for delivering the lighter mixture of gases from said first housing to one of the chambers of said second housing, means for heating the gases contained in the second chamber of said second housing, a cooler, means for delivering the lighter mixture of gases from said second housing to said cooler, a connection between said cooler and said evaporator, means for delivering the heavier mixture of gases from said second housing to the chamber of the first housing whereto the mixture of gases from the said evaporator is initially delivered, means for condensing the heavier gas of the mixture of gases delivered from said first housing, and means for delivering said condensed gas to said evaporator.

2. The combination with an evaporator of a refrigerator, of a thermal atmolysis apparatus connected to the evaporator and comprising a plurality of housings connected in series relationship and each having a cool chamber and a hot chamber separated from each other by a porous partition, means for delivering a mixture of gases of different diffusibilities to the cool chamber of the first housing, means for heating the gases contained in the hot chamber of the first housing, a connection between the hot chamber of the first housing and the cool chamber of the second housing, means for cooling the gases flowing through said connection whereby on delivery to the cool chamber of said second housing the said gases are cooled, means for heating the gases in the hot chamber of the second housing, means for cooling the hot gases flowing from the hot chamber of the second housing, means for delivering said cooled gases to said evaporator, means for delivering the gases from the cool chamber of the second housing to the cool chamber of the first housing, a condenser for condensing some of the heavier gas of the mixture contained in the cool chamber of the said first housing, and means for delivering said condensed gas to said evaporator.

3. The combination with an evaporator of a refrigerator, and a mixture of gases in said evaporator of different diffusibilities, of a thermal atmolysis apparatus connected to said evaporator, said thermal atmolysis apparatus comprising a plurality of thermal atmolysis devices connected in series relationship, means for supplying heat to effect atmolysis in the first of said devices, means for utilizing the heated gases delivered from said first device for supplying heat units to the other devices connected therewith in series relationship, means for cooling said heated gases after being delivered from the last device of the series, means for delivering said cooled gases to an intermediate device of the series, means for condensing some of the heavier gas of the mixture delivered from the first device, and means for delivering the condensed gas to the evaporator.

4. The combination with an evaporator of a refrigerator, and a mixture of gases in said evaporator of different diffusibilities, of a thermal atmolysis apparatus connected to said evaporator, said thermal atmolysis apparatus comprising a plurality of thermal atmolysis devices connected in series relationship, means for supplying heat to effect atmolysis in the first device, means for utilizing the heated gases delivered from said first device for supplying the heat units to the other devices connected in said series, means for cooling the heated gases after being delivered from the last device of the series, means for delivering said cooled gases to an intermediate device, means for condensing some of the heavier gas of the mixture delivered from the first device, means for vaporizing the condensed gas, means for delivering said vaporized gas to a second condenser wherein the gas is re-condensed, and means for delivering said re-condensed gas to the evaporator.

5. The combination with an evaporator of a refrigerator, and a mixture of sulphur dioxide and hydrogen gas therein, of a thermal atmolysis apparatus connected to said evaporator, said apparatus comprising a plurality of thermal atmolysis devices connected in series relationship with one another, means for supplying heat to the first device of said series, means for delivering the heated gases from said first device to the other devices of said series to impart heat units thereto, a cooler connected to the last device of said series for cooling the hydrogen gas delivered therefrom, means connecting said hydrogen cooler and said evaporator, a condenser for the sulphur dioxide connected to the first device of said series, heating means for evaporating the sulphur dioxide after being condensed, said heating means being supplied with heat units imparted thereto by the heated gases formed in said first device, a second condenser connected to said heating means for re-condensing the sulphur dioxide, means for delivering the re-condensed sulphur dioxide from said second condenser to said evaporator, and a connection to deliver the vaporized sulphur dioxide and the hydrogen from the evaporator to said first device, said first condenser being constructed and arranged to maintain a body of liquid sulphur dioxide therein.

6. The combination with an evaporator of a refrigerating unit, of a thermal atmolysis apparatus comprising a porous partition dividing the latter into two compartments, a mixture of hydrogen gas and sulphur dioxide contained in the evaporator and said atmolysis apparatus, means for heating the gases contained in one of the compartments of said atmolysis apparatus, a condenser for the sulphur dioxide connected between the other chamber of said atmolysis apparatus and said evaporator, and a cooler for the hydrogen gas connected between the chamber of the atmolysis apparatus wherein the gases are heated and the evaporator.

7. A refrigerating apparatus comprising an evaporator, a thermal atmolysis apparatus, means for delivering to said atmolysis apparatus from said evaporator a mixture of gases composed of a neutral gas and a refrigerating medium, means for maintaining the gases delivered to said atmolysis apparatus at a lower temperature than that of the predominantly neutral gas passing from said atmolysis apparatus, means for cooling the neutral gas on being delivered from said atmolysis apparatus, a connection between said cooling means and said evaporator for delivering to the latter the neutral gas in a cooled state, means for condensing after atmolyzation the refrigerating medium which is in mixture with the neutral gas, means for evaporating the refrigerating medium after said condensation, additional means disposed above said evaporating means for again condensing said refrigerating medium, a connection for delivering the evaporated refrigerating medium to said additional condensing means and a connection for delivering said refrigerating medium from said additional condensing means to said evaporator wherein the refrigerating medium may vaporize in the presence of the neutral gas and thereby extract heat from the walls of the evaporator.

8. A refrigerating apparatus operated by a combination of a neutral gas and a vaporizable refrigerating medium, which apparatus comprises an evaporator, a thermal atmolysis apparatus, a cooler for the neutral gas, two condensers for the refrigerating medium, one being disposed below said atmolysis apparatus and one being disposed above the evaporator, means for supplying heat to said atmolysis apparatus, means for delivering the neutral gas after atmolysis through the cooler to the evaporator, means for delivering by gravity the refrigerating medium after atmolysis to the condenser disposed below the atmolysis apparatus, means for evaporating the refrigerating medium after condensation, means for delivering the evaporated refrigerating medium to the said second condenser above the evaporator, a connection between said second condenser and said evaporator whereby the refrigerating medium in liquid form may be delivered by gravity to said evaporator, said refrigerating medium when in said evaporator being vaporized in the presence of the neutral gas thereby extracting heat from the evaporator walls, and means for delivering the mixture of neutral gas and the vaporized refrigerating medium after the latter has absorbed heat in the evaporator to said atmolysis apparatus.

9. A refrigerating apparatus operable by a combination of a neutral gas and vaporizable refrigerating medium, which apparatus comprises an evaporator, a thermal atmolysis apparatus, a cooler for the neutral gas, a condenser for the refrigerating medium disposed beneath said atmolysis apparatus, means for supplying heat to said atmolysis apparatus, means for delivering the neutral gas after atmolysis through the cooler to the evaporator, means for delivering by gravity the refrigerating medium after atmolysis to the said condenser, means for delivering the refrigerating medium after liquefaction to the evaporator wherein it is again vaporized in the presence of the neutral gas thereby extracting heat from the evaporator walls, and means for delivering the mixture of neutral gas and the vaporizable refrigerating medium from the evaporator to said atmolysis apparatus.

10. A refrigerating apparatus comprising an evaporator, a thermal atmolysis apparatus, means for delivering to said atmolysis apparatus from said evaporator a mixture of gases composed of hydrogen and sulphur dioxide, means for cooling the hydrogen on being delivered from said atmolysis apparatus, a connection between said cooling means and said evaporator for delivering to the latter the hydrogen in a cooled state, means for condensing after atmolyzation the sulphur dioxide which is in mixture with the hydrogen, means for evaporating the sulphur dioxide after said condensation, additional means for re-condensing said sulphur dioxide, and a connection for delivering said re-condensed sulphur dioxide to said evaporator wherein the sulphur dioxide may be vaporized in the presence of the hydrogen and thereby extract heat from the walls of the evaporator.

11. A refrigerating apparatus operable by a combination of hydrogen and sulphur dioxide, which apparatus comprises an evaporator, a thermal atmolysis apparatus, a cooler for the hydrogen, two condensers for the sulphur dioxide, one being disposed below said atmolysis apparatus, and one being disposed above the evaporator, means for supplying heat to said atmolysis apparatus, means for delivering the neutral gas after atmolysis through the said cooler to the said evaporator, means for delivering by gravity the sulphur dioxide after atmolysis to the condenser disposed below the atmolysis apparatus, means for evaporating the sulphur dioxide after condensation, means for delivering the evaporated sulphur dioxide to the second condenser disposed above the evaporator, a connection between said second condenser and said evaporator whereby the re-condensed sulphur dioxide is delivered by gravity to said evaporator, said sulphur dioxide when in said evaporator being vaporized in the presence of the hydrogen thereby extracting heat from the evaporator walls, and means for delivering the mixture of hydrogen and the vaporized sulphur dioxide after the latter has absorbed heat in the evaporator to said atmolysis apparatus.

12. A refrigerating apparatus operable by a combination of hydrogen and sulphur dioxide, which apparatus comprises an evaporator, a thermal atmolysis apparatus, a cooler for the hydrogen, two condensers for the sulphur dioxide, one being disposed below said atmolysis apparatus and one being disposed above the evaporator, means for supplying heat to said atmolysis apparatus, means for delivering the neutral gas after atmolysis through the said cooler to the said evaporator, means for delivering by gravity the sulphur dioxide after atmolysis to the condenser disposed below the atmolysis apparatus, means for evaporating the sulphur dioxide after condensation, means for delivering the evaporated sulphur dioxide to the second condenser disposed above the evaporator, a connection between said second condenser and said evaporator whereby the recondensed sulphur dioxide is delivered by gravity to said evaporator, said sulphur dioxide when in said evaporator being vaporized in the presence of the hydrogen thereby extracting heat from the evaporator walls, means for delivering the mixture of hydrogen and the vaporized sulphur dioxide after the latter has absorbed heat in the evaporator to said atmolysis apparatus, and a body of liquid sulphur dioxide maintained in a housing disposed beneath the said first condenser and connected thereto.

13. A refrigerating apparatus operated by a combination of hydrogen gas and sulphur dioxide, which apparatus comprises an evaporator, a thermal atmolysis apparatus, a cooler for the hydrogen, a condenser for the sulphur dioxide disposed below said atmolysis apparatus, means for supplying heat to said atmolysis apparatus, means for delivering the hydrogen after atmolysis through the cooler to the evaporator, means for delivering by gravity the sulphur dioxide after atmolysis to the said condenser, means for delivering the sulphur dioxide after liquefaction to the evaporator whereby it is vaporized in the presence of a hydrogen thereby extracting heat from the evaporator walls, and means for delivering the mixture of hydrogen and the vaporized sulphur dioxide from the evaporator to said atmolysis apparatus.

14. A refrigerating apparatus operated by a combination of hydrogen gas and sulphur dioxide, which apparatus comprises an evaporator, a thermal atmolysis apparatus, a cooler for the hydrogen, a condenser for the sulphur dioxide disposed below said atmolysis apparatus, means for supplying heat to said atmolysis apparatus, means for delivering the hydrogen after atmolysis through the cooler to the evaporator, means for delivering by gravity the sulphur dioxide after atmolysis to the said condenser, means for delivering the sulphur dioxide after liquefaction to the evaporator whereby it is vaporized in the presence of a hydrogen thereby extracting heat from the evaporator walls, means for delivering the mixture of hydrogen and the vaporized sulphur dioxide from the evaporator to said atmolysis apparatus, and a housing disposed beneath said condenser containing a body of liquid sulphur dioxide, said housing communicating with said condenser.

15. The process of extracting heat from the walls of an evaporator which comprises mixing two gases in a closed system including the evaporator, one of said gases being a neutral gaseous medium and the other being a readily condensible refrigerating medium, separating said gases from each other by thermal atmolysis through a porous partition, the gases on one side of said partition being maintained at a temperature lower than that of the predominantly neutral gas on the opposite side of said partition whereafter some of the neutral gas is cooled and then delivered to said evaporator and some of the condensible gas is condensed and then delivered to said evaporator where it is allowed to evaporate and extract heat from the walls of the evaporator, and then delivering the cooled mixture of gases from the evaporator whereafter it is again subjected to thermal atmolysis to partake of cyclic operation in the closed system.

16. The process of extracting heat from the walls of an evaporator which comprises mixing hydrogen and sulphur dioxide in a closed system including the evaporator, the hydrogen gas constituting a neutral gaseous medium and the sulphur dioxide gas being readily condensible and constituting the refrigerating medium, separating the hydrogen gas from the sulphur dioxide by thermal atmolysis whereafter some of the hydrogen gas is cooled and then delivered to said evaporator and some of the sulphur dioxide gas is condensed and then delivered to said evaporator where it is allowed to evaporate and extract heat from the walls of the evaporator, maintaining a body of liquid sulphur dioxide gas whereat the same is condensed, and then delivering the cooled mixture of gases from the evaporator whereafter it is again subjected to thermal atmolysis to partake of cyclic operation in the closed system.

17. The process of extracting heat from the walls of an evaporator which comprises mixing two gases in a system including the evaporator, one of said gases being a neutral gaseous medium and the other being a condensible refrigerating medium, separating the gases from each other by thermal atmolysis through a porous partition, the gases on one side of said partition being maintained at a temperature lower than that of the predominantly neutral gas on the opposite side of said partition whereafter some of the neutral gas is cooled and then delivered to said evaporator and some of the condensible gas is condensed and then delivered to said evaporator where it is allowed to evaporate and extract heat from the walls of the evaporator.

18. The process of extracting heat from the walls of an evaporator which comprises mixing two gases in a closed system including the evaporator, one of said gases being a neutral gaseous medium and the other being a readily condensible refrigerating medium, separating said gases from each other by thermal atmolysis through a porous partition, the gases on one side of said partition being maintained at a temperature lower than that of the predominantly neutral gas on the opposite side of said partition whereafter some of the neutral gas is cooled and then delivered to said evaporator and some of the condensible gas is condensed and then delivered to said evaporator where it is allowed to evaporate and extract heat from the walls of the evaporator, then delivering the cooled mixture of gases from the evaporator whereafter it is again subjected to thermal atmolysis to partake of cyclic operation in the closed system, and maintaining a liquid body of the condensible refrigerating medium where the same is condensed after the atmolysis of the gases.

19. A thermal atmolysis apparatus comprising a housing having a porous partition therein, means for delivering a mixture of gases of different diffusibilities to one side of said partition, means for heating the gases on the other side only of said partition, a second housing having a porous partition, means for directing the heated gases from said first housing to heat the gases on one side only of said second partition, and means for directing the gases on the other of said second partition to the side of said first partition that is opposite the side whereat the gases are initially heated.

20. A thermal atmolysis apparatus comprising a housing having a porous partition therein to form two chambers, means for delivering a mixture of gases of different diffusibilities to one side of said partition, means for heating the gases on the other side only of said partition, a second housing having a porous partition therein, means for heating the gases in one chamber only formed by said second partition, and means for delivering the gases from the other side of said second partition to said first housing on the side of the first porous partition that is opposite to the side whereat the gases are initially heated.

21. A thermal atmolysis apparatus comprising a plurality of housings connected in series and each having a porous partition to form two chambers in each housing, means for delivering a mixture of gases of different diffusibilities to one chamber of the first housing, means for heating the gases in the other chamber of said first housing, means for delivering the gases from said second chamber to the first chamber in the next housing, means for heating the gases in the second chamber of said second housing, a cooler, means for delivering the lighter mixture of gases from said second housing to said cooler, means for delivering the heavier mixture of gases from said second housing to said first housing, and means connected to said first housing for condensing part of the heavier gas contained in the mixture of gases delivered to said first housing.

22. A method of separating a mixture of gases of different diffusibilities, which includes passing said mixture into the first of a series of thermal atmolyzation apparatuses, passing the more diffusible effluent from each apparatus before the last in the series to the input side of the next following apparatus, returning the less diffusible effluent from each apparatus after the first in the series to the input side of the preceding apparatus in the series, removing the final more diffusible gas from the last named apparatus in the series, and removing the final less diffusible component from the first apparatus in the series.

23. A thermal atmolysis apparatus comprising a walled housing forming a chamber, a porous partition disposed therein separating said chamber into a first and second compartment, means for delivering to said first compartment a mixture of gases of different diffusibilities, radiant heating means in contact with the gas in said second compartment in spaced relation to said porous partition for effecting thermal atmolysis of said mixture in said first compartment into a more diffusible gas and a less diffusible gas without dilution of either of said gases, means for withdrawing the more diffusible gas from said second compartment, and means for withdrawing the less diffusible gas from said first compartment.

24. A thermal atmolysis apparatus comprising a walled housing forming a chamber, a porous partition disposed therein separating said chamber into a first and second compartment, means for delivering to said first compartment a mixture of gases of different diffusibilities, a solid heating member in contact with the gas within said second compartment in spaced relation to said porous partition for effecting thermal atmolysis of the mixture in said first compartment into a more diffusible gas and a less diffusible gas, means for withdrawing the more diffusible gas from said second compartment, and means for withdrawing the less diffusible gas from said first compartment.

25. The apparatus of claim 24 wherein said solid heating member comprises an electrical heating element.

26. The apparatus of claim 24 wherein said heating member comprises means for maintaining a fluid heating medium within said compartment in indirect heat exchanging relation with the gas in said second compartment whereby to heat the more diffusible gas without admixture thereof with said heating fluid.

27. A thermal atmolysis apparatus comprising a walled housing forming a chamber, a porous partition disposed therein separating said chamber into a first and second compartment, means for delivering to said first compartment a mixture of gases of different diffusibilities, a solid heating member disposed within said second compartment in spaced relation to said porous partition for effecting thermal atmolysis of the mixture in said first compartment into a more diffusible gas and a less diffusible gas, means for withdrawing the more diffusible gas from said second compartment, means for withdrawing the less diffusible gas from said first compartment, and means for abstracting heat from the less diffusible gas in said first compartment.

28. The apparatus of claim 27 wherein said heat abstracting means comprises means for maintaining a fluid cooling medium in indirect heat exchanging relation with the less diffusible gas in said first compartment whereby to cool said less diffusible gas without admixture with said fluid cooling medium.

29. The apparatus of claim 27 wherein said heating member comprises means for maintaining a fluid heating medium within said second compartment in indirect heat exchanging relation with the gas in said second compartment whereby to heat said more diffusible gas without admixture thereof with said heating fluid.

30. The process of separating a mixture of gases of different diffusibilities into a more diffusible gas and a less diffusible gas which comprises subjecting said mixture to atmolysis through a porous partition while maintaining a solid heating element adjacent one face only of said porous partition in heat exchanging relation with the more diffusible gas.

31. The process of claim 30 wherein the gas pressure of said mixture on one side of said partition is maintained higher than the gas pressure of the more diffusible gas on the opposite side of said partition, whereby the rate of atmolysis is increased.

32. The combination with an evaporator of a refrigerating unit, of a thermal atmolysis apparatus comprising a porous partition separating said apparatus into two compartments, a mixture of refrigerant and a neutral gas of lower molecular weight than said refrigerant contained in said evaporator, means for delivering said mixture from said evaporator to the first of said compartments, a solid heating member for heating the predominantly neutral gas in the second compartment on the opposite side of said partition, means for conducting the neutral gas from said second compartment to said evaporator, means for cooling the refrigerant in said first compartment, a condenser, means for conducting the cooled refrigerant from the first named compartment to said condenser, and means for conducting the refrigerant from said condenser to said evaporator.

33. The combination with an evaporator of a refrigerating unit, of a thermal atmolysis apparatus comprising a porous partition separating said apparatus into two compartments, a mixture of refrigerant and neutral gas of lower molecular weight than said refrigerant contained in said evaporator, means for delivering said mixture from said evaporator to the first of said compartments, a solid heating member for heating the predominantly neutral gas in the second compartment on the opposite side of said partition, a cooler, means for conducting the separated neutral gas from said second compartment to said cooler, means for conducting the cooled neutral gas from said cooler to said evaporator, means for cooling the refrigerant in the first of said compartments, a condenser, means for conducting the cooled gaseous refrigerant from the first named compartment to said condenser, and means for conducting the refrigerant from said condenser to said evaporator.

RASMUS M. HVID.